United States Patent [19]

Mosca

[11] Patent Number: 5,779,901

[45] Date of Patent: Jul. 14, 1998

[54] SELF-DECLOGGING FILTRATION DEVICE

[75] Inventor: Pierre Mosca, Coublevie, France

[73] Assignee: Cellier Groupe S.A., Aix les Bains, France

[21] Appl. No.: 782,367

[22] Filed: Jan. 13, 1997

[30] Foreign Application Priority Data

Jan. 15, 1996 [FR] France ................................. 96 00558

[51] Int. Cl.$^6$ ........................... B01D 29/68; B01D 29/35
[52] U.S. Cl. .................. 210/411; 210/415; 210/494.2; 210/497.1
[58] Field of Search .............................. 210/411, 415, 210/497.1, 494.2, 413

[56] References Cited

U.S. PATENT DOCUMENTS

| | | |
|---|---|---|
| 2,275,958 | 3/1942 | Hagel . |
| 4,315,820 | 2/1982 | Mann . |
| 4,818,402 | 4/1989 | Steiner . |
| 5,152,891 | 10/1992 | Netkowicz . |
| 5,370,791 | 12/1994 | Lescovich . |
| 5,401,396 | 3/1995 | Lescovich . |
| 5,443,726 | 8/1995 | Steiner . |
| 5,554,284 | 9/1996 | Bartelt . |
| 5,595,655 | 1/1997 | Steiner . |

FOREIGN PATENT DOCUMENTS

| | | |
|---|---|---|
| 0312354 | 4/1989 | European Pat. Off. . |
| 3-106 | 5/1989 | Japan . |
| 525019 | 8/1972 | Switzerland . |
| 1384414 | 2/1975 | United Kingdom . |
| 1448577 | 9/1976 | United Kingdom . |
| 1485989 | 9/1977 | United Kingdom . |
| 2157964 | 11/1985 | United Kingdom . |

Primary Examiner—Thomas M. Lithgow
Attorney, Agent, or Firm—Harris Beach & Wilcox, LLP

[57] ABSTRACT

Apparatus for filtering a suspension having a chamber containing a cylindrical filter cartridge. At least one suction box is rotatably mounted inside the cartridge containing a scraper blade for riding in contact with the inside face of the cartridge. The blade is arranged to direct material removed from the cartridge into an opening formed in the box wherein the material is removed from the chamber.

8 Claims, 6 Drawing Sheets

SELF-DECLOGGING FILTRATION DEVICE

TECHNICAL FIELD

The invention relates to the technical field of filtration, and more particularly to the filtration of suspensions, more particularly of highly concentrated and highly viscous liquids. It finds its application in various industries, such as chemistry, pharmacy, papermaking, paints and varnishes, and even pollution-control recovery activities.

PRIOR ART

Several devices are known for filtering suspensions, that is to say highly concentrated solutions.

In an embodiment widely available commercially, a filtration unit comprises a chamber inside which is arranged a filter cartridge having a calibrated porosity. The liquid to be treated is introduced into the chamber on the inside of the filter cartridge, and when the liquid is under pressure it passes through the porous wall of the cartridge in order to appear in the peripheral region of the chamber from which it is expelled. The direction of flow of the suspension may equally well be the opposite direction, and in this case the liquid passes through the cartridge from the outside inwards.

Of course, passing the suspension through the filter medium causes the largest particles, or indeed agglomerates, to be deposited on the internal (or external) face of the cartridge. This clogging occurs all the more quickly when the suspension contains a large quantity of contaminants or particles of large size. It therefore proves necessary periodically to cease running in order to clean the cartridge, resulting in lengthy operations and a waste of time corresponding to this cleaning.

In order to alleviate this drawback, it has been proposed to equip the filter cartridge with a rotary device which includes scrapers carried by radial arms which travel around the internal (or external) periphery of the cartridge. Thus, when material has agglomerated on the cartridge, the scrapers, due to their friction against the wall of the cartridge, lift off the mass of contaminants and thus re-establish free passage of the suspension to be treated.

This solution, although widely used and successfully exploited, especially by the Applicant under the trade mark FILTERCEL®, has the major drawback of not completely removing the agglomerated particles. On the contrary, under gravity they accumulate in the bottom of the cartridge or of the chamber. In order to remove this waste, it is consequently necessary to stop the facility in order to purge the cartridge. Unfortunately, this operation results in a loss of the not yet filtered suspension present in the cartridge. This operation therefore increases the cost of the filtration in the case of suspensions to be treated which contain high-value products, such as especially the fillers necessary for coating paper. Furthermore, it results in an increase in the quantity of effluent.

Moreover, in order to ensure continuous filtration, and given the aforementioned cleaning operations, it is necessary to use two filters mounted in parallel, one of which remains in operation while the other undergoes declogging. Needless to say, this solution is not economically satisfactory.

It has also been proposed in document CH-A-525019, corresponding to U.S. Pat. No. 3,574,509, to equip a similar filtration facility with a suction box arranged inside the filter cartridge. Such a suction box is mounted on a rotary assembly in such a way that it can travel around the inside contour of the cartridge. Declogging of the impurities stuck to the cartridge is achieved by backflow suction. Unfortunately, when the impurities are firmly embedded on the cartridge, suction does not work. Furthermore, these impurities consequently cause agglomeration of additional impurities and the fowling becomes irremediable. Increasing the suction pressure does not generally work. In the case where it does allow lift-off, it is at the cost of a high consumption of the solution already filtered and so to the detriment of the profitability of such an operation.

One of the problems which the invention aims to solve is that of the continuous filtration of a suspension, compatible with maintaining the filter cartridge in a state of optimum cleanliness.

Another problem which the invention seeks to solve is that of the successive agglomeration of impurities at highly encrusted sites.

A third problem posed is that of the excessive consumption of already-filtered solution during backwashing.

STATEMENT OF THE INVENTION

The invention therefore relates to a device for the filtration of suspensions, of the type which includes:
- a chamber of cylindrical general shape, having two ports, respectively the inlet port and the outlet port, for the suspension to be filtered;
- a cylindrical filter cartridge with longitudinal axis XX', placed inside the chamber and having a calibrated porosity between its first face and its second face, these faces being ordered in the direction of flow of the suspension to be filtered; the suspension to be filtered flowing from the inlet port to the cartridge, then passing through the wall of the cartridge from its first face to its second face and then being discharged via the outlet port,
- at least one suction box tangential to the cartridge, the opening in the suction box lying opposite a generatrix of the first face of the cartridge, the said suction box being rotationally driven with respect to the longitudinal axis of the cartridge.

This device is characterized in that, on an end face of its opening, the suction box includes a declogging scraper which comes into contact with the first face of the cartridge.

In other words, the surface of the filter medium located on the unfiltered-suspension side is scraped and the impurities lifted off are sucked away as a backflow, a certain part of the filtered suspension passing back through the cartridge in order to drive the contaminants towards the suction box.

Of course, the position of the characteristic suction box is a function of the direction of filtration of the suspension.

In other words, when the suspension flows from the inside of the cartridge outwards, a blade travels around the internal surface of the cartridge, the blade lifting off the agglomerated impurities on the internal face of the cartridge and allowing them to be sucked away.

In the case of filtration in the opposite direction, that is to say from the outside of the cartridge inwards, the suction box is located against the external periphery of the cartridge.

Thus, for centrifugal filtration, the coarse particles agglomerated on the internal face (or the external face in the case of centripetal filtration) of the cartridge are definitely lifted off and immediately sucked away.

In practice, the blade forming the scraper is advantageously oriented in the direction of rotation of the suction box. The impurities are consequently lifted off upstream of their suction through the opening in the suction box proper.

The impurities are therefore accompanied by the characteristic blade just before they are sucked away.

In order to solve the problem of economizing on the solution to be filtered, on the end face opposite the scraper, the suction box includes a deflector which is placed at a slight distance from the first face of the cartridge in order to leave a volume having a very small thickness for the calibrated passage of the suspension and its laminar flow in order to entrain the impurities lifted off.

In other words, the end faces of the opening in the suction box have, on one side, a tangential scraper forming a lip enabling the impurities to be lifted off and, on the other side, a sheet limiting entry of unfiltered suspension into the suction box. In other words, the end faces of the opening in the suction box are designed so that the sucked liquid serving for declogging comes mostly, by far, from the filtered region and thus passes through the cartridge in order to lift off the clogging impurities and entrain them as a backflow.

The gap corresponding to the layer of fluid, left between the deflector and the wall of the cartridge, must be sufficient to prevent this deflector from acting as a scraper and from lifting off the impurities before they can be sucked away. Moreover, the length of this deflector, determining the length of the gap, measured in the direction of movement of the suction box, must be sufficient to generate head losses which reduce to a minimum the flow of unfiltered suspensions.

Advantageously, in the vicinity of the opening in the suction box, the deflector has a portion chamfered parallel to the blade. The characteristic blade and the deflector consequently form a channel of small width into which the impurities are entrained.

In practice, in order to ensure effective declogging, the device advantageously includes a means intended to press the scraper of the suction box against the first face of the cartridge. Thus, sufficient pressure is provided to ensure effective scraping.

In practice, the suction box is connected to suction means. However, in the case of filtration of a fluid under pressure, it may be advantageous to connect the suction box directly to atmosphere in order to limit the equipment necessary.

In a more sophisticated version of the invention, the suction box includes an internally tangential rotary cylinder forming a rotary chamber, having elongate slots distributed along different generatrices.

In other words, the suction box includes an additional member intended to localize the suction in a sequential manner to only certain regions of the opening in the suction box.

In this way, the suction is greater and the declogging more effective. The position of the slots can be adjusted in such a way that the upper suction regions move so as to cover the entire internal surface of the cartridge. Moreover, reducing the suction area to just the slots opposite the opening in the suction box enables the suction flow and therefore the power of the vacuum equipment, as well as the consumption and re treatment of the already filtered suspension, to be appreciably decreased.

Advantageously, the device comprises cams which rotate the rotary chamber inside the suction box progressively as the suction box revolves inside the cartridge.

In other words, passage from one suction region to another takes place sequentially and in a mechanical manner, without requiring additional interventions.

In another embodiment, the device includes a plurality of suction boxes which are angularly offset with respect to each other about the axis XX' of the cartridge and the openings in which each lie at different levels along the height of the cartridge.

In other words, several suction boxes are arranged inside (or outside) the cartridge, each ensuring declogging of one section along the height of the cartridge. The offset operation of each of these suction boxes advantageously enables the backflow consumption of already filtered suspension to be decreased.

BRIEF DESCRIPTION OF THE DRAWINGS

The manner of realizing the invention, as well as the advantages which stem therefrom, will be clearly apparent from the description of the embodiments which follow, in support of the appended figures in which.

MANNER OF REALIZING THE INVENTION

Figure 1:
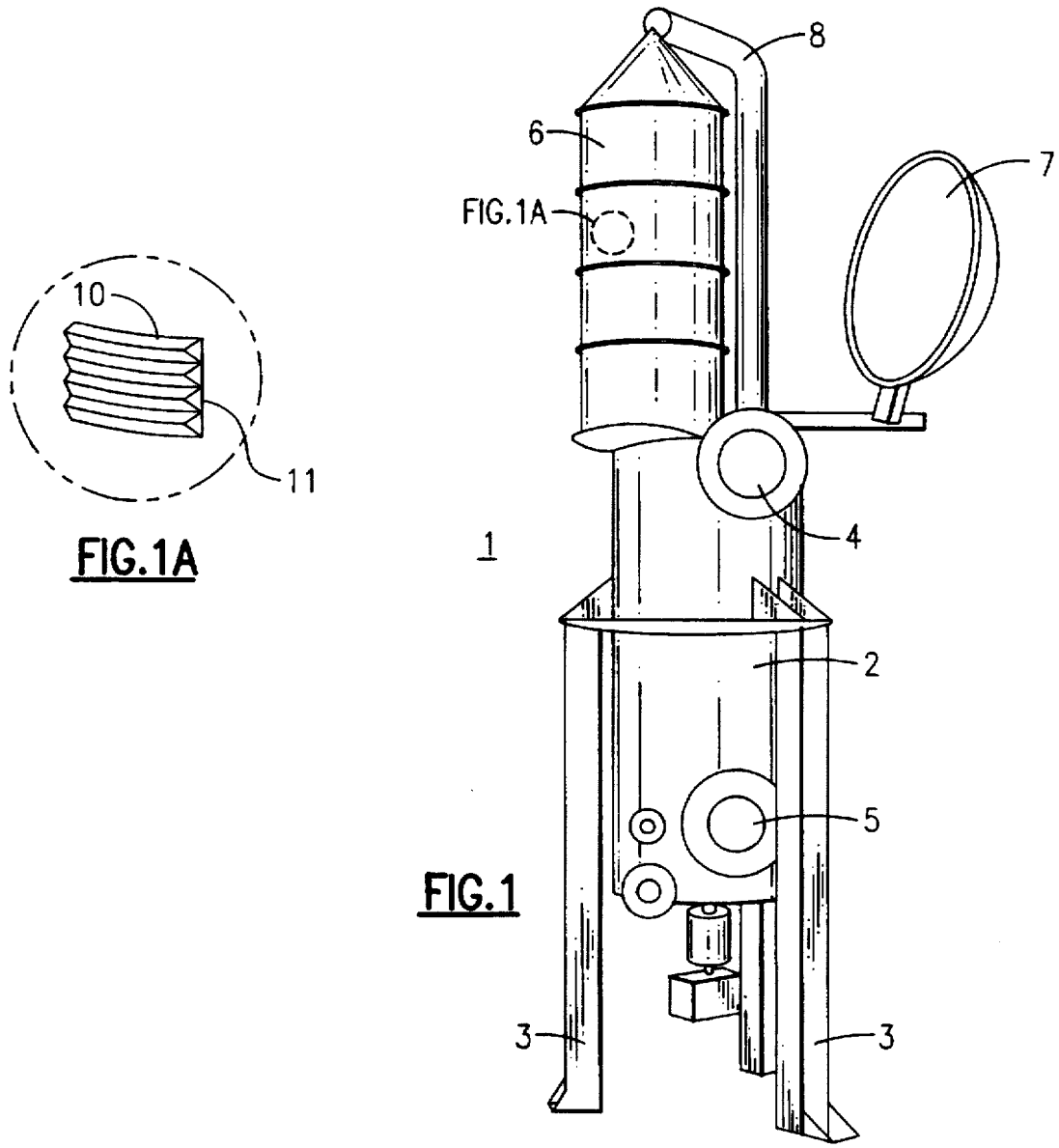
FIG. 1 is a side view of a filtration device in which the chamber is open and the cartridge extracted via the top.

In general, the invention applies to a filter device as illustrated in FIG. 1.

Thus, this device (1) includes a cylindrical chamber (2) raised up by a mounting on three feet (3). This chamber (2) comprises, near the top, an inlet port (4) for the suspension to be filtered and, near the bottom, an outlet port (5) for the treated suspension. Inside the chamber (2) there is a filter cartridge (6) which can be extracted after opening the upper lid (7), handling of the filter cartridge being facilitated by a support arm (8) adjacent to the chamber.

As already stated, filtration may be effected equally well from inside the filter medium outwards or the opposite way around. In the rest of the description, the direction of flow of the suspension is chosen to be from the inside of the cartridge outwards.

With regard to the cartridge (6), this also has a cylindrical shape and is produced in a known manner so as to exhibit satisfactory porosity. In the application illustrated, the filter is produced by winding a metal wire (10) of triangular section. The parallel sides (11) of the wires, along a generatrix of the cylinder forming the cartridge, are located on the internal side of the cartridge (6).

Figure 2:
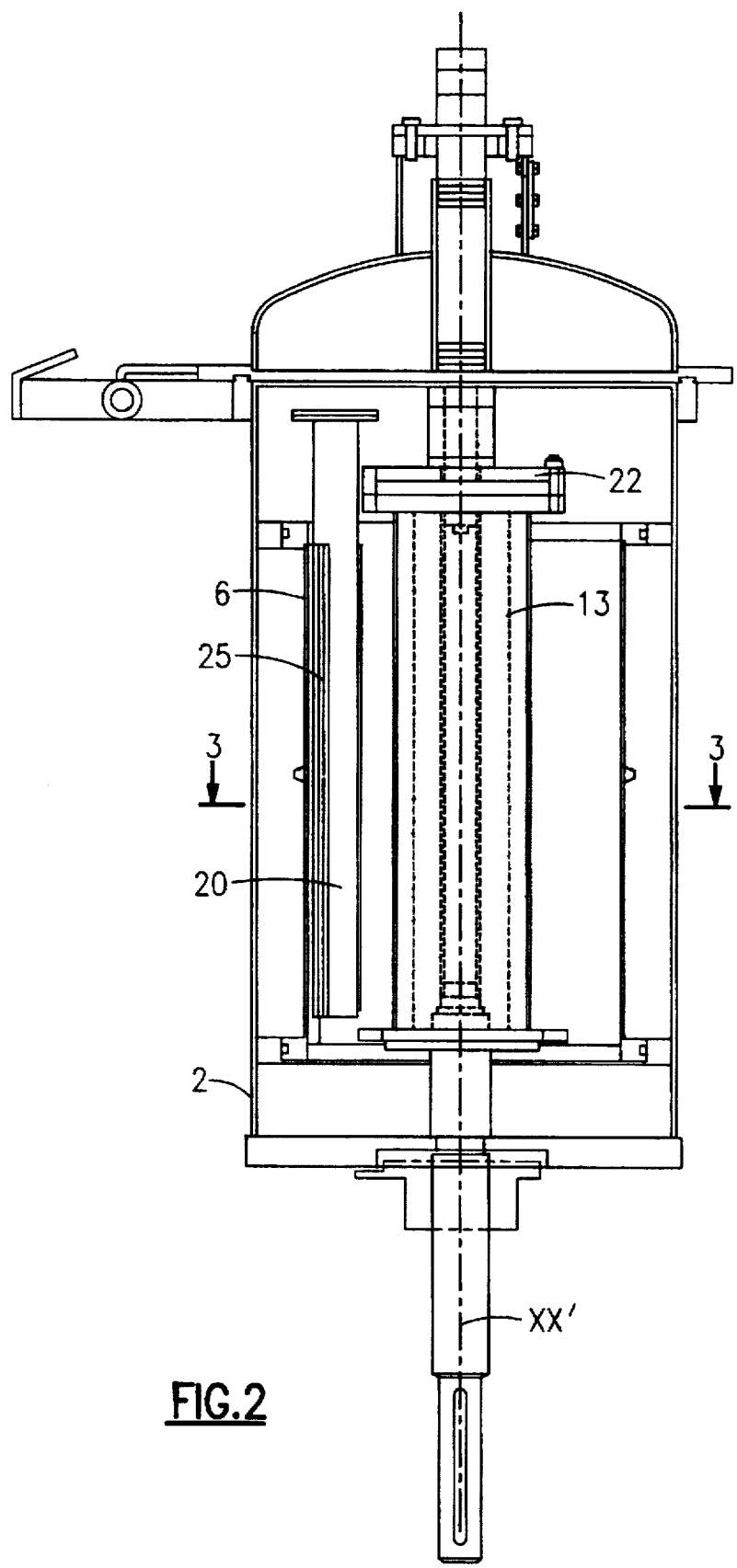
FIG. 2 is a side view of a device in accordance with the invention.

In accordance with the invention, the filter is equipped with a suction-type declogging device. This device is principally made up of a suction box (20), having a cylindrical or other shape, the opening (21) in which lies opposite a generatrix of the filter cartridge (6) (see FIG. 2). Of course, the invention also covers devices comprising several suction boxes distributed inside (or around) the filter cartridge, these suction boxes being controlled independently or otherwise.

Moreover, the suction box is associated with means (22) for rotating the suction box (20) in order to allow it to travel around the entire internal periphery of the cartridge (6). The suction box (20), and more precisely its opening (21), has a length at least equal to the height of the cartridge.

Figure 3:
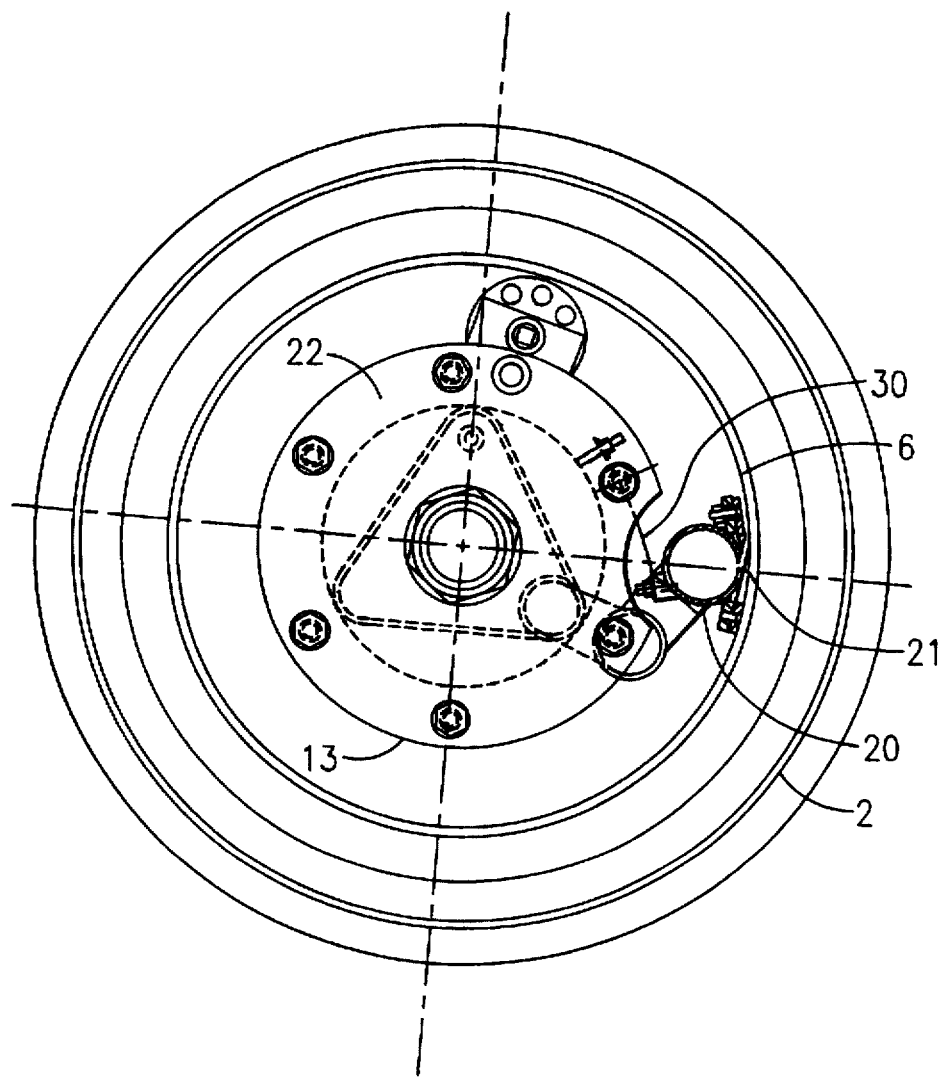
FIG. 3 is a cross-section along the direction of the arrows III-III' in FIG. 2.

In practice, the suction box (6) is associated with a collector (23) enabling the filtered and recovered impurities to be discharged (see FIG. 3).

In order to allow effective declogging (see FIG. 4), the suction box (6) is associated with a scraper (25). This scraper (25) consists of a longitudinal sheet made of hard material, such as treated metal or ceramic, and fastened to an end face (26) of the opening (21) in the suction box. More precisely, this is the end face (26) located to the rear of the opening (21) in the suction box (20) with respect to the direction R of revolution of the said box.

It is important that the scraper (25) has an edge (27) permanently in contact with the internal periphery (12) of the cartridge (6). This is why the geometry, and especially the angle of incidence of this edge (27), are of major importance. Thus, as may be seen in FIG. 4, the blade (25) is oriented along the direction of rotation of the suction box in such a way that, on the one hand, its edge (27) comes into contact with the cartridge (6) upstream of the suction region formed by the opening (21) and that, on the other hand, the blade (25) is also as little inclined as possible with respect to the internal periphery (12) of the cartridge. The impurities are therefore lifted off in an optimum fashion.

In other words, the opening (21) in the suction box (20) travels around the internal surface (12) of the cartridge (6) slightly after the scraper (25), thereby allowing suction of the impurities after they have been lifted off by the inclined scraper (25) and driven away.

In order to allow this scraper (25) to press properly against the internal surface of the cartridge (6), the suction box (20) is associated with elastic means (30) enabling the suction box (20), and especially the scraper (25), to be pressed against the internal periphery (12) of the cartridge (6).

It may be seen in FIG. 3 that the inside of the cartridge (6) has a cylindrical hollow volume (13) whose function is to limit the volume of suspension present in the cartridge, and more precisely to increase the ratio between the filtering surface and the volume of suspension.

Figure 4:
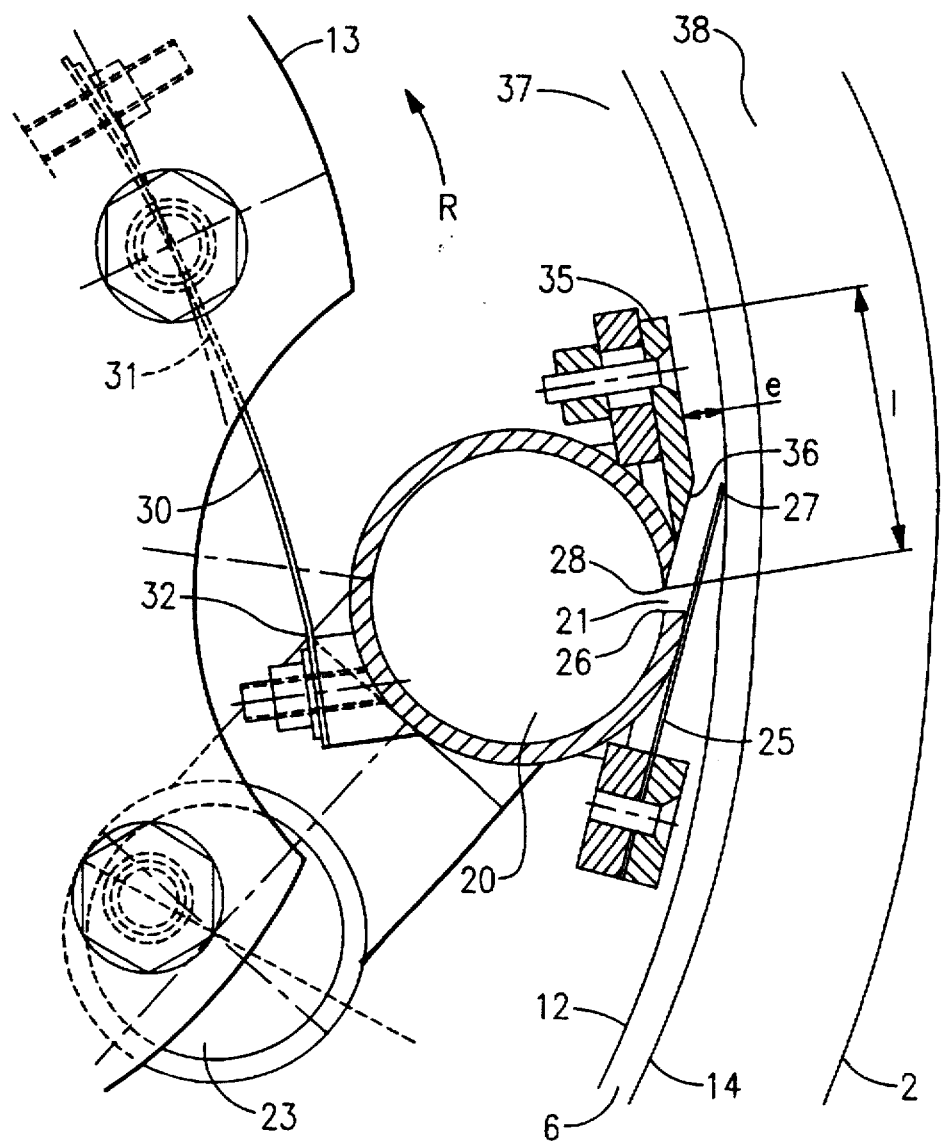
FIG. 4 is a detailed view, taken from FIG. 3, of the suction region.

Thus, in the form illustrated in FIG. 4, the means for pressing the suction box consist of a bent elastic strip (30), one end (31) of which is connected to the hollow volume (13) and the other end (32) to part of the suction box (20). Of course, the invention also covers all alternative forms in which this strip (30) would be replaced by equivalent elastic means.

Moreover, the end face (28) of the opening (21) in the suction box (20), opposite the scraper (25), includes a longitudinal plate (35) forming a deflector. Two dimensional parameters of this plate (35) are particularly important for optimum operation of the suction box (20).

Thus, the gap (e) lying between the external face (36) of this plate (35) and the internal periphery (12) of the cartridge (6) must be large enough for this plate (35) not to act as a scraper and detach the impurities before the scraper (25) passes, which would thus cause this waste to drop down inside the filter cartridge (6), which, as already stated, constitutes one of the drawbacks which the invention seeks to avoid. Conversely, this gap (e) must not be too great in order to avoid too much suspension to be filtered being sucked away by the characteristic box (20).

Additionally, the length (1) of the plate (35), measured in the direction of movement of the suction box (20), determines, in combination with the gap (e), the value of the head losses between the inside (37) of the cartridge and the suction box (20). Thus, increasing this length (1) increases the head losses and decreases the parasitic suction of unfiltered suspension.

Of course, these various parameters (e, 1) can be adjusted depending on the type of suspension to be treated, and especially on its rheology.

Advantageously, as illustrated in FIG. 4, this deflector is chamfered (36) in such a way that the channel formed with the scraper (25) has a constant thickness.

The collector (23) associated with the suction box (20) may be connected to suction means (not shown), of the vacuum-pump type. In uses of the filter under pressure, the vacuum pump may be dispensed with, the collector then being connected directly to atmospheric pressure.

Figure 5:
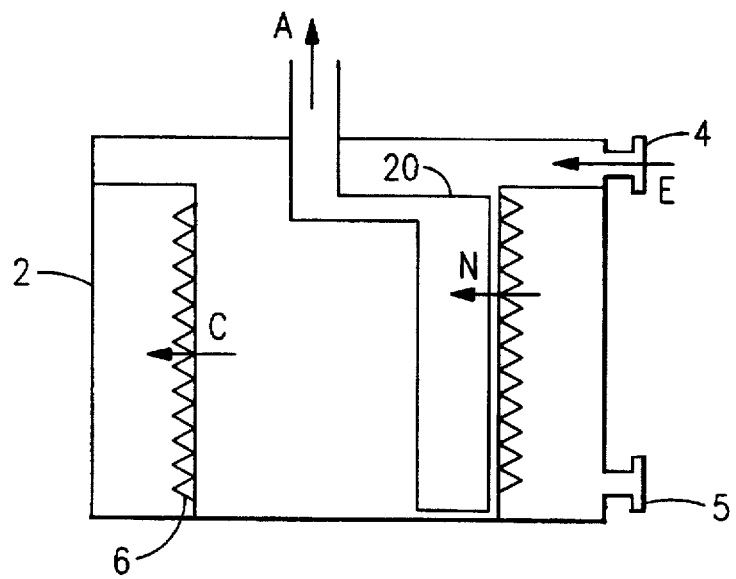
FIGS. 5 and 6 are diagrams explaining the flow of the various liquids, respectively during declogging and washing of the filter.
Figure 6:
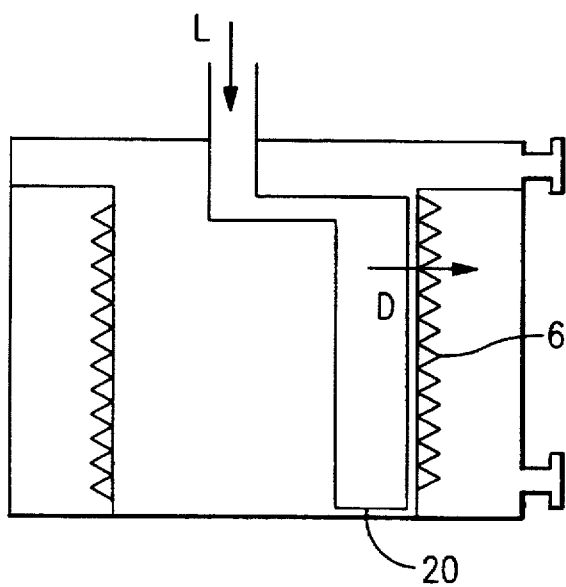

The operation of the device is illustrated in FIGS. 5 and 6.

When the suspension is introduced (arrow E) under pressure into the cartridge (6), it naturally has a tendency to pass through (arrow C) the filter cartridge (6). In the case in which the suspension to be filtered is, for example, a papermaking suspension, this contains fibers which may clog the openings in the pores of the cartridge (6). Thus, as the suction box (20) rotates, the scraper (25) associated with the opening (21) in the said box (20) detaches these clogging impurities. Simultaneously, the characteristic box (20) sucks away, through the cartridge (6), a certain quantity of already filtered suspension which passes back through (arrow N) the cartridge (6) and which, in passing through entrains the detached impurities. Typically, the pressure difference between the inside (37) and the outside (38) of the cartridge is generally between 0.2 and 0.5 bar, while the pressure difference between the outside (38) of the cartridge (6) and the suction box (20) is about 2 bar. As already stated, in order to avoid too much unfiltered suspension being sucked away, the distance (e) between the plate (35) and the internal periphery (12) of the cartridge (6) is adjusted.

Thereafter, the liquid sucked away is conveyed (arrow A) to any means (not shown) allowing recovery of the filtered product and its recycling and removal or the recovery of the impurities. These means may, especially in the application to the filtration of a papermaking suspension, be a vibrating screen.

The means allowing declogging may also be used to clean and wash the filter cartridge (6). Thus, when the filtration device is emptied it may prove to be advantageous to inject (arrow L) water into the suction box, this water, when it reaches the opening in the suction box, passing through (arrow D) the cartridge (6) and cleaning it. It should be noted that, in this case, the flow of the washing liquid in the characteristic means takes place in the opposite direction to suction of the impurities.

It has been seen that declogging of the filter requires the consumption of a certain quantity of already filtered suspension. In order to limit this consumption, an additional device associated with the suction box (20) has been developed.

Figure 7:
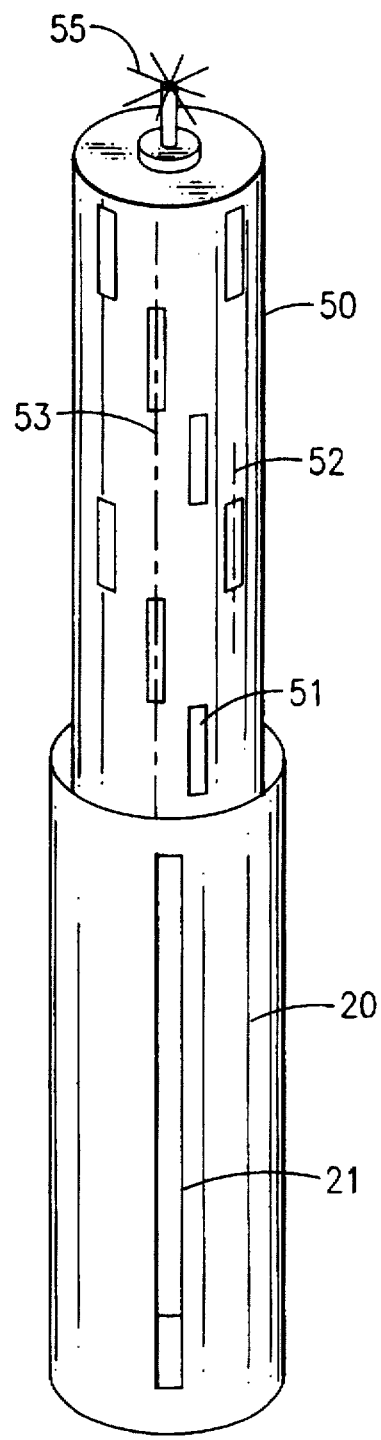
FIG. 7 is a summary perspective view of the rotary chamber fitted in a suction box in an alternative form of the invention, shown in the extracted position.

Thus (see FIG. 7), the suction box includes an additional cylinder (50) forming a rotary chamber whose outside diameter is very slightly less than the inside diameter of the box (20).

This rotary chamber (50) has a plurality of oblong openings (51). The large dimensions (52) of its slots (51) lie on a generatrix (53) of this cylinder (50). These slots (51) are distributed over the circumference and the length of this cylinder (50) and are angularly offset. Consequently, when this rotary chamber (50) is in place in the suction box (20), only a portion of the opening (21) in the said box is active. Thus, suction and declogging take place only in the region corresponding to those openings in the rotary chamber opposite that (21) in the box, thereby, on the one hand, reducing the volume of already filtered suspension consumed and, on the other hand, increasing the suction power and thus the efficacy of the declogging.

Advantageously, the top of this cylinder has a cam-operated sequential changing device (55). Thus, as the box (20) revolves around the circumference of the cartridge (6), these cam means (55) encounter complementary means (not shown) arranged on the cartridge (20) which cause the rotary chamber to rotate through a predetermined angle and thus shift the regions of active suction vertically.

From the foregoing it emerges that the device in accordance with the invention is mechanically very simple. It allows declogging, by means of a continuous backflow, of the filter cartridge and removal, again continuously, of the clogging impurities. It follows that, on the one hand, the filter is permanently clean and its performance characteristics are improved and, on the other hand, the interruptions necessary for cleaning the filter cartridge are well spaced out.

POSSIBILITIES OF INDUSTRIAL APPLICATION

The device in accordance with the invention allows the filtration of various types of solutions. Mention may be made especially of the suspensions intended for the paper-making industry, such as coating baths or suspensions of pigments, in the paint, ink and varnish industry, as well as in chemistry, parachemistry and similar industries.

This filtration device may also serve to recover contaminants in water-treatment operations.

I claim:

1. Apparatus for the filtration of a suspension that includes:

a cylindrical chamber having an inlet port and an outlet port for routing a suspension through said chamber, a cylindrical filter cartridge mounted inside said chamber having a first face and a second face that are ordered in the direction of suspension flow through said chamber, said faces having a predetermined porosity, said ports being arranged to direct flow from the inlet port through the first and second faces and out of the chamber through the outlet port, at least one suction box mounted inside the cartridge tangentially to the cartridge, said suction box having an opening that lies opposite a generatrix of said first face, means for rotating the suction box with respect to the central axis of said cartridge, and said suction box further including a declogging scraper that rides in contact with said first face of said cartridge, said scraper being fastened to said suction box adjacent to said opening and being arranged to direct material removed from said cartridge into said opening and said suction box further including an internal rotary mounted cylinder forming a rotary chamber, said internal cylinder having elongated slots therein distributed along different generatrices.

2. The apparatus of claim 1 wherein said scraper is a blade oriented in the direction of rotation of said suction box.

3. The apparatus of claim 2 wherein the suction box includes a deflector mounted a given distance from said first face of said cartridge.

4. The apparatus of claim 3 wherein said deflector has a chamfer formed thereon that is parallel to said blade.

5. The apparatus of claim 1 that further includes biasing means for urging the scraper against said first face.

6. The apparatus of claim 1 that further includes a suction means that is connected to the suction box.

7. The apparatus of claim 1 that further includes cam means for rotating the chamber inside the suction box as the suction box revolves inside the cartridge.

8. The apparatus of claim 1 that further includes a plurality of spaced apart suction boxes mounted inside said cartridge, having openings which lie in different planes along the length of the cartridge.

* * * * *